US012641076B2

(12) United States Patent
Bone et al.

(10) Patent No.: US 12,641,076 B2
(45) Date of Patent: May 26, 2026

(54) ENHANCED SECURITY FOR ONE TIME PASSCODE DELIVERY VIA EMAIL

(71) Applicant: Wells Fargo Bank, N.A., San Francisco, CA (US)

(72) Inventors: Larissa Bone, Berkeley, CA (US); Suzanne M. Fisi, Clayton, CA (US); Weston Thackeray Thompson, Claremont, CA (US); Ravi Kanth Thota, San Francisco, CA (US); Luis C. Valenzuela, Woods Cross, UT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 241 days.

(21) Appl. No.: 18/625,776

(22) Filed: Apr. 3, 2024

(65) Prior Publication Data

US 2025/0317436 A1     Oct. 9, 2025

(51) Int. Cl.
*H04L 9/40* (2022.01)
*H04L 9/32* (2006.01)

(52) U.S. Cl.
CPC ........ *H04L 63/0838* (2013.01); *H04L 9/3228* (2013.01); *H04L 63/107* (2013.01)

(58) Field of Classification Search
CPC . H04L 63/0838; H04L 9/3228; H04L 63/107; H04L 2463/082
See application file for complete search history.

(56) References Cited

U.S. PATENT DOCUMENTS

| | | | | |
|---|---|---|---|---|
| 9,847,973 | B1 | 12/2017 | Jakobsson et al. | |
| 10,491,624 | B2 | 11/2019 | Ng et al. | |
| 11,595,336 | B2 | 2/2023 | Jakobsson | |
| 2005/0039019 | A1 | 2/2005 | Delany | |
| 2005/0216587 | A1 | 9/2005 | John | |
| 2007/0198642 | A1 | 8/2007 | Malik | |
| 2012/0167233 | A1 | 6/2012 | Gillum | |
| 2024/0283657 | A1* | 8/2024 | Jose | H04L 9/3297 |
| 2025/0097038 | A1* | 3/2025 | Hertrich | H04L 9/3213 |

* cited by examiner

*Primary Examiner* — Huan V Doan
(74) *Attorney, Agent, or Firm* — SCHWEGMAN LUNDBERG & WOESSNER, P.A.

(57) ABSTRACT

Disclosed are methods, systems, computing devices, and machine-readable mediums for securing the delivery of OTPs via email. The disclosed methods utilize one or more of a combination of server-side vulnerability scans; security policy compliance enforcement; email provider integration to allow for real-time threat scanning; and/or utilizing executable files or secure links for additional authentication and OTP retrieval. This system ensures that OTPs are only sent to secure, verified email addresses and that the recipient's environment meets the necessary security standards.

20 Claims, 9 Drawing Sheets

ENHANCED SECURITY FOR ONE TIME PASSCODE DELIVERY VIA EMAIL

TECHNICAL FIELD

Embodiments pertain to authentication and security. Some embodiments relate to increasing security for authentication codes sent through email.

BACKGROUND

Two-factor authentication (2FA) is a security process in which users provide two distinct forms of identification before gaining access to an account or system. The first factor is typically something the user knows, such as a password or PIN, while the second factor is something the user has, like a physical token, or something the user is, such as a biometric characteristic. Email-based 2FA falls into the category of "something the user has," as it utilizes the user's access to a specific email account as a way to verify their identity. When a user attempts to log in, after entering their password, the system sends a unique, time-sensitive code to their registered email address. The user must then retrieve this code from their email and enter it into the system to complete the authentication process.

Using email for two-factor authentication provides an additional layer of security beyond just a username and password. It is predicated on the assumption that while a password can be stolen or guessed, gaining access to the user's secured email account is significantly more challenging for an attacker. This method leverages the user's existing email infrastructure, which makes it convenient and cost-effective for both users and service providers. Users typically have immediate access to their email accounts through various devices, including smartphones, tablets, and computers, allowing for prompt retrieval of the authentication code. For service providers, email-based 2FA does not require the development or support of additional hardware or software tokens, making it a straightforward solution to implement.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
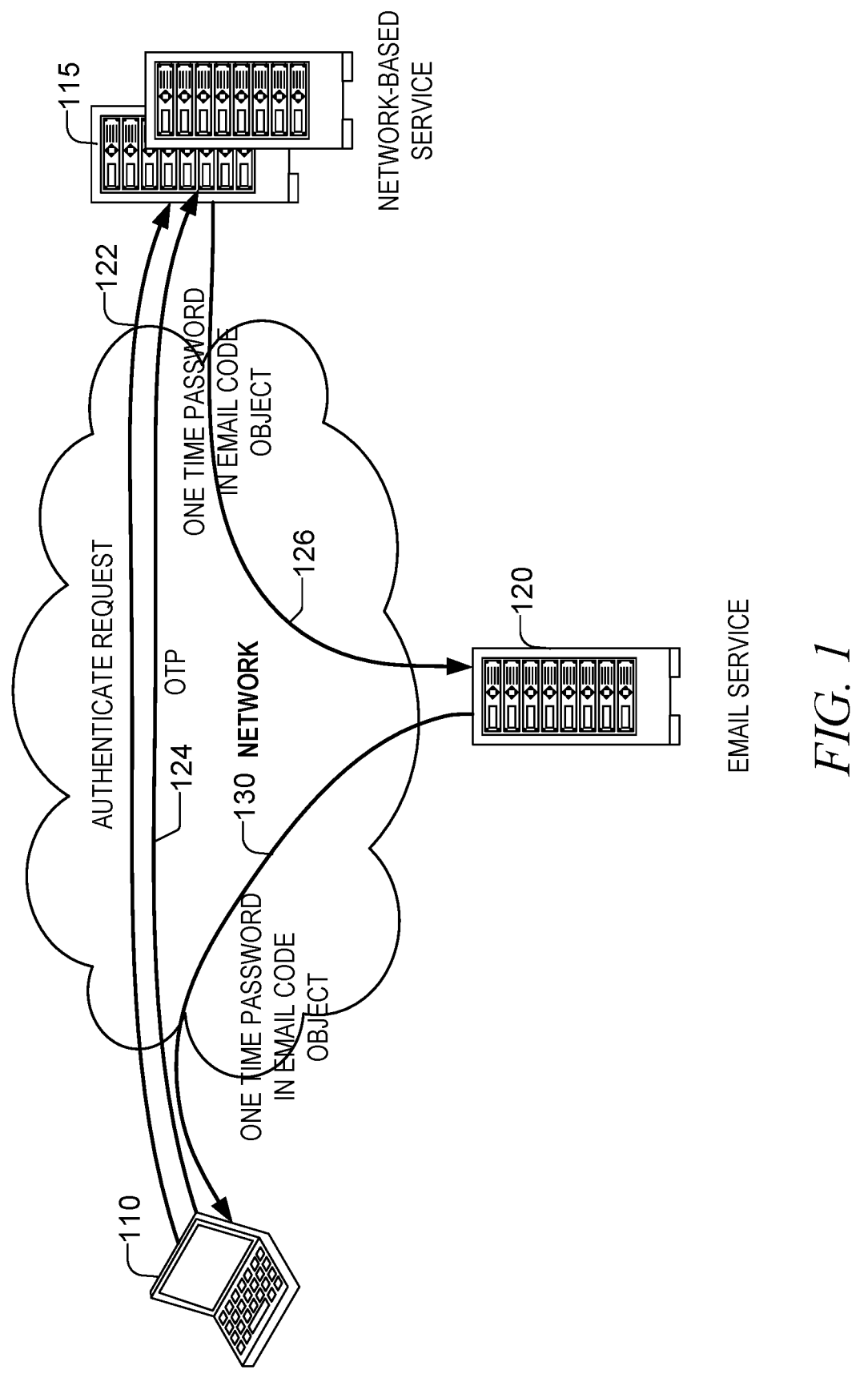
FIG. 1 illustrates a diagram of an email-based One-Time Password (OTP) authentication to a network-based service according to some examples of the present disclosure.

The reliance on email as a secure channel for two-factor authentication is not without its drawbacks. Email accounts themselves can be vulnerable to various security threats, such as phishing attacks, account compromise, and interception by malware or man-in-the-middle attacks. If an attacker gains access to a user's email account, they can potentially intercept the 2FA codes sent by the service provider, thereby nullifying the added security benefit. Additionally, email delivery can sometimes be delayed or disrupted, which can be inconvenient for users who require immediate access. Despite these concerns, email remains a widely used channel for 2FA due to its ubiquity and ease of use, especially for services where the risk level is deemed moderate and the convenience of email outweighs the potential security risks.

Disclosed are methods, systems, computing devices, and machine-readable mediums for securing the delivery of OTPs via email. The disclosed technology utilizes one or more of a combination of server-side vulnerability scans, security policy compliance enforcement, and email provider integration to allow for real-time threat scanning; and/or utilizing executable files or secure links for additional authentication and OTP retrieval. This technology may help with security by, for example, ensuring that OTPs are only sent to secure, verified email addresses and that the recipient's environment meets the necessary security standards. The multi-faceted email-based OTP security technology comprises one or more of the following components and methods:

Server-Side Vulnerability Scan: Prior to sending an OTP, the system conducts a server-side scan of the recipient's email address against a comprehensive vulnerability database. If the scan results are clean, indicating no known vulnerabilities or risks associated with the email address, the system proceeds to send the OTP via email. This scan may be done by the network-based service or may be done using third-party tools and/or services. Example services include Echosec Beacon, DarkOwl Vision, Crowdstrike Falcon Intelligence Recon, SpyCloud ATO Prevention, and the like.

Email Provider Security Policy Compliance: The system evaluates the security policies of the recipient's email provider against specified guidelines. If the email provider's policies meet or exceed these guidelines, which may include encryption standards, anti-phishing measures, and account recovery protocols, the system allows the OTP to be sent. The security policies may be scraped automatically from a website of the email provider, obtained using a Application Programming Interface (API), or manually reviewed by an administrator.

Email Provider Integration and Security Scan: The system integrates directly with the email provider's infrastructure to perform a real-time security scan. This scan assesses the current security posture of the email account. If the scan shows a clean status and the provider's policies align with the predetermined criteria, the OTP is dispatched. In some examples, one or more signals may be analyzed to determine if the account is subject to suspicious activity. Example signals may include: logins at hours that are not usual for the user; logins from geographic locations that are inconsistent with the user's known locations; multiple failed login attempts; recent changes to account settings that differ from the user's information provided to the network-based service; recent session activity from devices that are not typical of the user; or the like.

Executable File Verification: In certain scenarios, the system sends an executable file along with the email or through a link, which the recipient runs on their devices. This file conducts a local scan of the recipient's computer for security threats and may require additional user verification steps, such as answering security questions or providing biometric data, before revealing the OTP. The executable file may perform a risk assessment which may be based upon the results of a malware scan; a location of the recipient's computing device (e.g., whether it corresponds to locations known to be associated with the account holder of the network-based service-determined either through previous logins or account setup information); a scan of other identity information on a device of the user and whether that identity information matches the listed identity of the account holder of the network-based service; a determination of whether the computer on which the file is being run is a same computer authenticating with the network-based service; and/or the like. The application may also collect biometric data or prompt the user to answer security questions. Upon successful verification, the application may calculate and display the OTP, or cause the OTP to be sent to the user via a separate email.

Secure Link for OTP Retrieval: Instead of sending the OTP directly, the system sends a secure link in the email. When the user clicks this link, they are redirected to a secure website controlled by the system. This site collects metrics about the user, such as IP address and geographic location, to determine if the access attempt is from an expected location. The site may also collect biometric data or prompt the user to answer security questions. Upon successful verification, the OTP is displayed or sent to the user.

By employing these methods, either individually or in combination, the methods disclosed herein significantly strengthens the security framework around email-based OTP delivery. The system is designed to be adaptable to various user environments and risk profiles, ensuring that OTPs are delivered in a secure and controlled manner.

FIG. 1 illustrates a diagram of an email-based OTP authentication to a network-based service 115 according to some examples of the present disclosure. User computing device 110 is attempting to authenticate with the network-based service 115. The authentication request 122 is sent by the user computing device 110 to the network-based service 115. In response, the network-based service 115 may request primary credentials from a user of the user computing device 110 (not shown for clarity). If the credentials match credentials of an account of the network-based service 115, then the network-based service 115 may then move on to the secondary authentication of the OTP. A code object may be sent along with an email 126 to an email server of an email service 120 corresponding to an email address of the account holder. The code object may be an executable, a plug in, a script, or the like. The code object may be created custom for the customer. For example, the code object may have a number of precompiled routines and have a shared secret associated with a particular customer inserted—e.g., in a configuration file-just prior to sending.

The email with the code object is sent to the email server associated with the email service 120. This email, with the code object, may be delivered 130 to the user computing device 110 as part of an email application executing on the user computing device 110. The user may open the email and activate the code object. The code object may run and complete a security evaluation. The security evaluation may scan the user computing device to determine a security risk score, and if the security risk score is below a threshold, may generate an OTP. In some examples, the security evaluation may comprise one or more of a malware scan; collection of metrics about the user computing device, such as IP address and geographic location to determine if the access attempt is from an expected location; collection of biometric data; security question prompts; or the like.

If the security evaluation is failed, the code object may send an indication of the failure to the network-based service. If the security evaluation passes, the OTP may be displayed on a display communicatively coupled to the user computing device 110. The user may then enter the OTP in a UI element of an application used to access the network-based service 115. The OTP may then be transmitted 124 to the network-based service. The application may be a browser application, a specialized application used to interface with the network-based application, or the like. The network-based service may validate whether the OTP matches the OTP expected. If the OTP matches, the user may be authenticated to the network-based service or to additional functions or operations of the network-based service. If the OTP does not match, the user's authentication may fail and the user may be denied access to the network-based service or to additional functions or operations of the network-based service.

Figure 2:
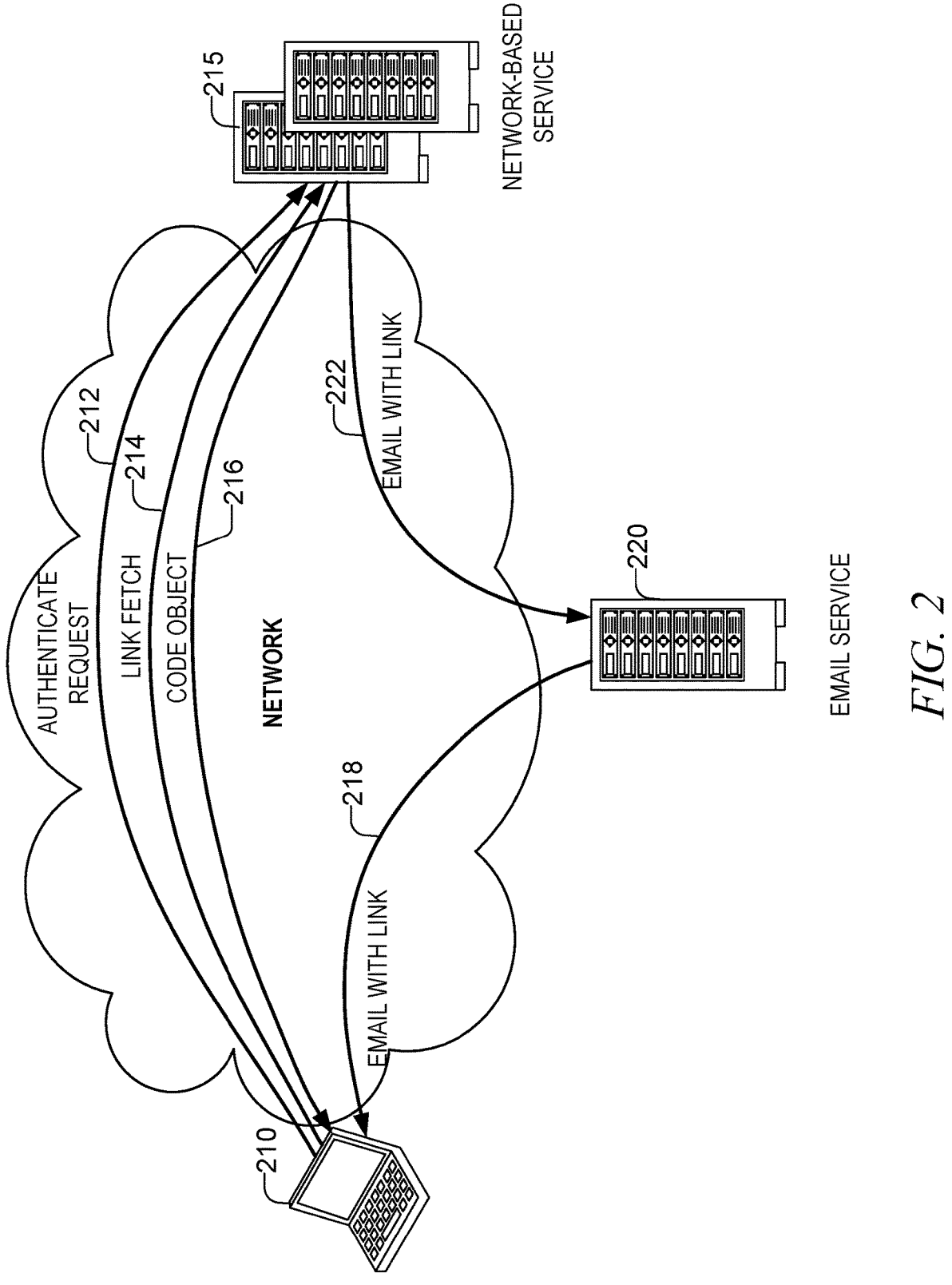
FIG. 2 illustrates a diagram of an email-based OTP authentication to a network-based service according to some examples of the present disclosure.

FIG. 2 illustrates a diagram of an email-based OTP authentication to a network-based service 215 according to some examples of the present disclosure. User computing device 210 is attempting to authenticate with the network-based service 215. The authentication request 212 is sent by the user computing device 210 to the network-based service 215. In response, the network-based service 215 may request primary credentials from a user of the user computing device 210 (not shown for clarity). If the credentials match credentials of an account of the network-based service 215, then the network-based service 215 may then move on to the secondary authentication of the OTP. Instead of a code object as shown in FIG. 1, in the authentication shown in FIG. 2, a link 214 is sent along with an email 222 to an email server of an email service 220 corresponding to an email address of the account holder. The email is then delivered 218 to the user computing device 210. This link 214, when activated, allows for the download of the code object 216, which may be an executable, a plug-in, a script, or the like, which may be created custom for the customer. For example, the code object accessible via the link 214 may have a number of precompiled routines and have a shared secret associated with a particular customer inserted—e.g., in a configuration file-just prior to being made available for download.

The email containing the link 214 to download the code object is sent to the email server associated with the email service 220. This email, with the link 214, may be delivered to the user computing device 210 as part of an email application executing on the user computing device 210. The user may open the email and activate the link 214 to download and then activate the code object. The code object, once downloaded and run, completes a security evaluation. The security evaluation may scan the user computing device 210 to determine a security risk score, and if the security risk score is below a threshold, may generate an OTP. In some examples, the security evaluation may comprise one or more of a malware scan; collection of metrics about the user computing device 210, such as IP address and geographic location to determine if the access attempt is from an expected location; collection of biometric data; security question prompts; or the like.

If the security evaluation fails, the code object may send an indication of the failure to the network-based service 215. If the security evaluation passes, the OTP may be displayed on a display communicatively coupled to the user computing device 210. The user may then enter the OTP in a UI element of an application used to access the network-based service 215. The OTP may then be transmitted to the network-based service 215. The application may be a browser application, a specialized application used to interface with the network-based application, or the like. The network-based service 215 may validate whether the OTP matches the OTP expected. If the OTP matches, the user may be authenticated to the network-based service 215 or to additional functions or operations of the network-based service 215. If the OTP does not match, the user's authentication may fail and the user may be denied access to the network-based service 215 or to additional functions or operations of the network-based service 215.

Figure 3:
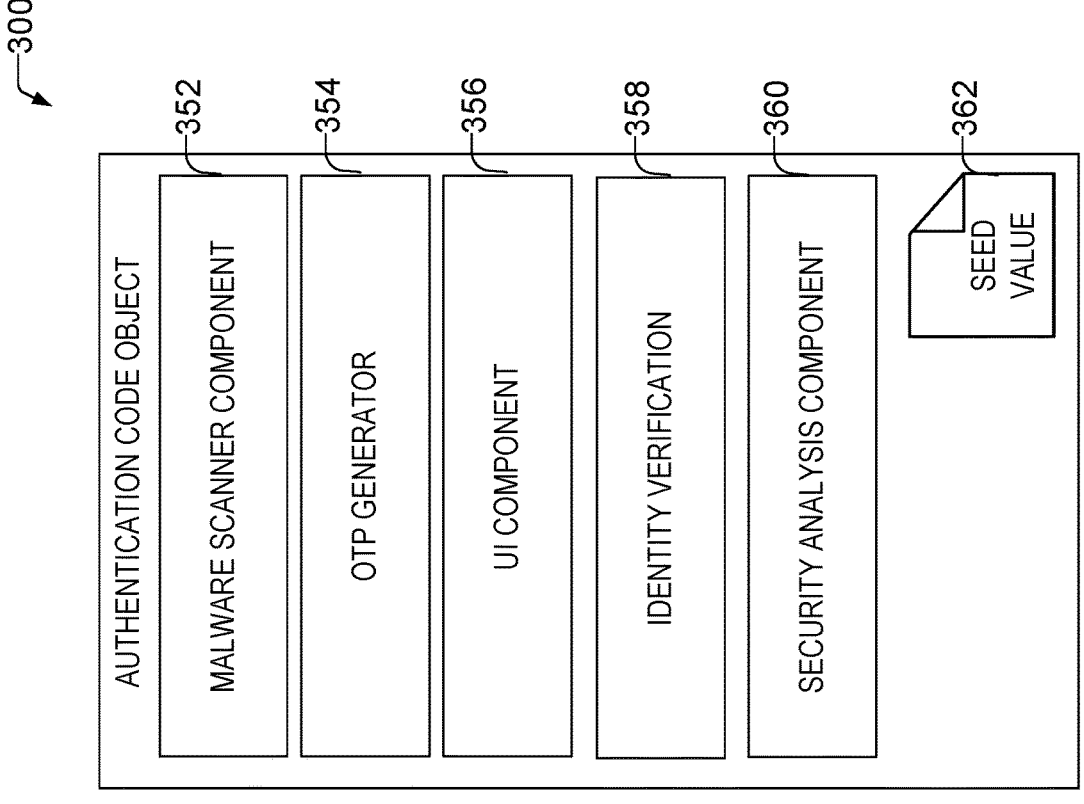
FIG. 3 illustrates a logical diagram of a user computing device and the authentication code object according to some examples of the present disclosure.
Figure 3:
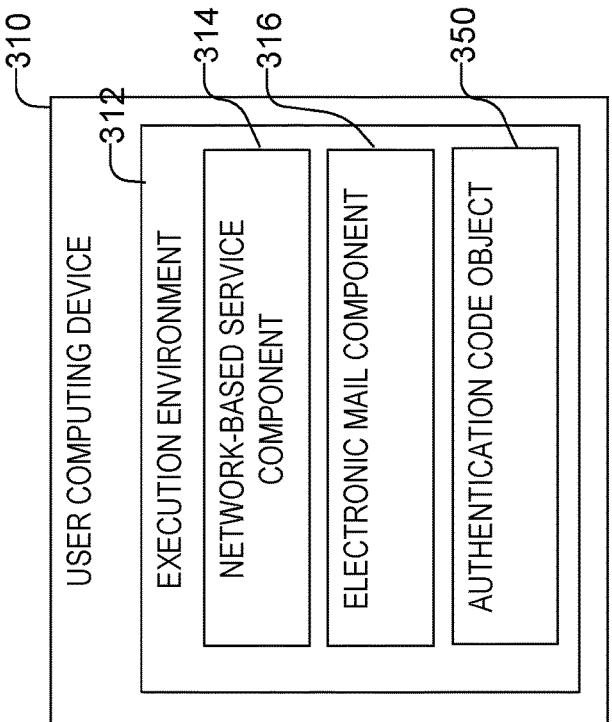

FIG. 3 illustrates a logical diagram 300 of a user computing device 310 and the authentication code object 350 according to some examples of the present disclosure. Authentication code object 350 may be an example of a code object sent with regard to the systems shown in FIGS. 1 and 2. The user computing device may have an execution environment 312 which may include an operating system and/or one or more applications such as browser applications. The network-based service component 314 may provide one or more user interfaces for accessing and interfacing with the network-based service. Network-based service component 314 may be a standalone application or may be a browser-based application. Electronic mail component 316 may include an email application, which may be browser based or a specific application. Electronic mail component 316 may interface with an email server and retrieve one or more emails for an account of a user.

Authentication code object 350 may ensure that the user computing device 310 is secure and in some examples further verifies a user's identity before providing the OTP. In some examples, the authentication code object may have a malware scanner component 352 that scans the user computing device for malware. OTP generator 354 may generate one or more OTP codes, such as Time-Based One-Time Passcode (TOTP) based upon the seed value 362. Seed value 362 is shared with the network-based service to generate an OTP at the server side to compare with the user entered value.

UI component may present one or more user interfaces to inform the user on what the authentication code object is doing, report results of malware scans, ask identity verification questions, and provide the OTP. Identity verification component 358 may cause one or more identity verification questions to be posed to the user via UI component 356. In some examples, the questions may be provided by the network-based service either in the authentication code object itself, or through network-based communication with the authentication code object. Answers may be checked by the authentication code object and those answers may be provided to the authentication code object 350 by the network-based service-either in the authentication code object itself, or through network-based communication with the authentication code object. Identity verification component may also collect information about the user's computing device such as system type, ip address, geolocation, and the like. Identity verification component 358 may also communicate with one or more biometric scanning devices communicatively coupled to the user computing device 310 to capture a biometric scan. This biometric scan may be compared to a biometric sample established for the user of the account of the network-based service previously. If the scan matches the sample (e.g., within a threshold margin of error), the user's identity may be verified. If the scan does not match the sample, the user's identity may not be verified.

Security analysis component 360 may utilize the malware scan results and/or the information obtained by the identity verification component 358 to determine a security score. The security score may measure the risk of providing the user access to the network-based service or to a function or resource of the network-based service. The security score may reflect whether the user computing device 310 has been compromised by malware such as viruses, worms, and other security threats. The security score may also reflect the degree to which the authentication code object 350 believes that the user of the user computing device 310 is the user attempting to authenticate to the network-based service. Factors used by the security analysis component 360 for identity verification include one or more of: biometric scans, knowledge-based questions, location, device fingerprint (e.g., hardware and software information)—e.g., whether the device is a same device used previously to connect to the network-based service, or the like. Security analysis component 360 may utilize one or more rules for combining one or more of the signals to create a risk score. The risk score may be a weighted sum of the signals used, the weights may be assigned by an administrator of the network-based service and may be included in the authentication code object. If the risk score is below a threshold risk, then the OTP generator may generate an OTP and display it through the UI component. If the risk score is not below the threshold risk, the OTP may not be generated. The threshold may be set by an administrator of the network-based service and may be provided to the authentication code object in the code object itself or via network-based communications.

In some examples, one or more functions of the authentication code object may be performed by the network-based service. For example, the OTP may be generated by the network-based service and sent back to the authentication code object for display. In other examples, the OTP may be generated and sent to the user's email address in a separate email once the security analysis component 360 determines that the risk score is below the threshold risk. In some examples, the seed value may be segmented into two values. For example, the seed value may be a first value and a second value that are combined to create the seed value. One value may be provided with the authentication code object and the second value is provided by the network-based service (using network-based communication) once the security analysis component determines that the risk score is below the threshold. This ensures that the seed value is not transmitted to an unknown device and also makes man-in-the middle attacks more difficult as the attacker would have to compromise both the network path between the user computing device 310 and the network-based service but also the user's email account.

Figure 4:
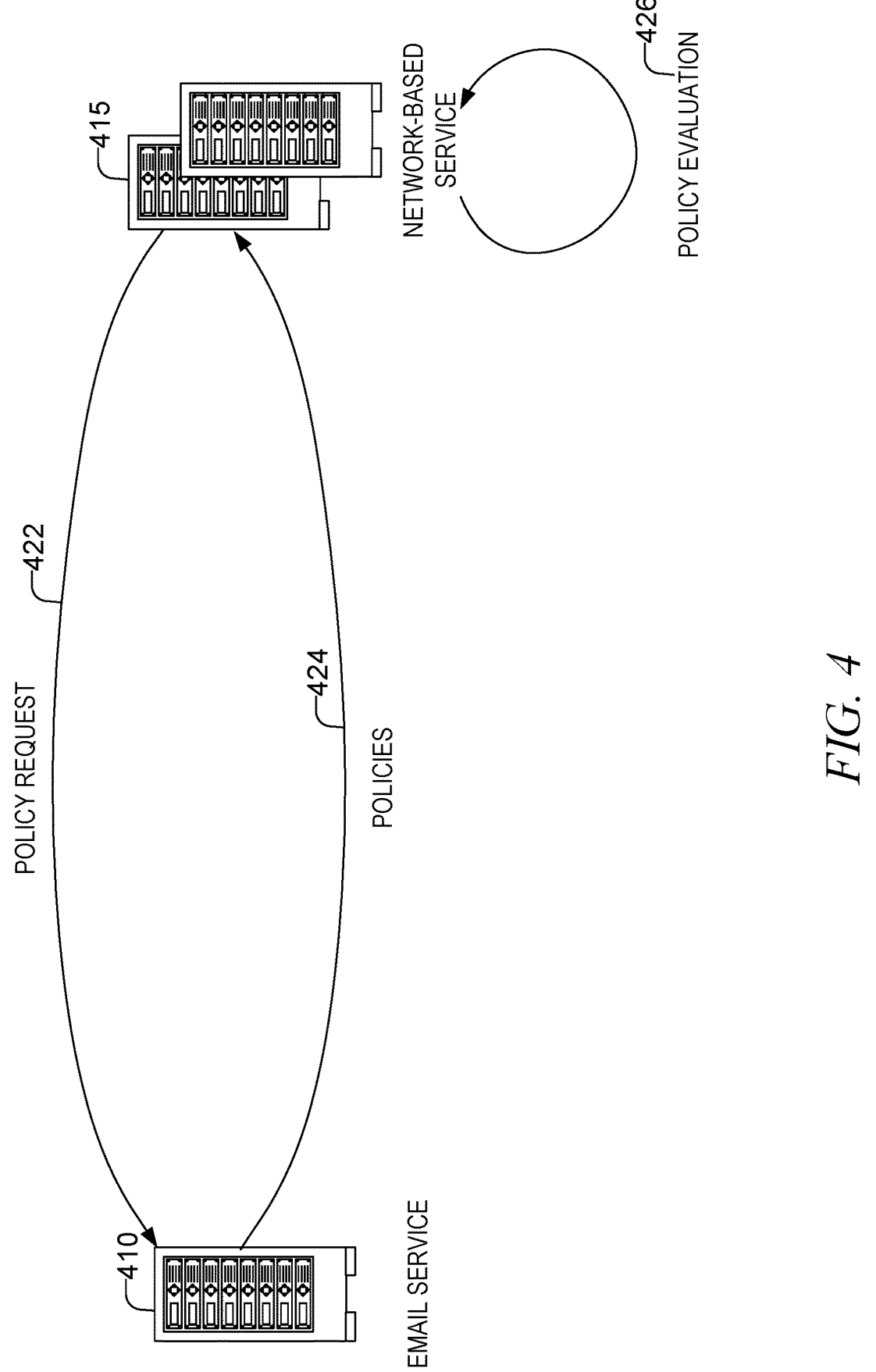
FIG. 4 illustrates a diagram of an email-based OTP authentication to a network-based service according to some examples of the present disclosure.

FIG. 4 illustrates a diagram of authorizing an email-based OTP authentication to a network-based service 415 according to some examples of the present disclosure. The network-based service may send OTP passwords via an email with the OTP, or can send a code object or a link to a code object, which can generate an OTP in an email based upon identifying that policies of the email service meet security standards set by the network-based service. In some examples, the network-based service sends a policy request 422 to the email service 410. Email service 410 responds with policies 424. In some examples, the network-based service 415 may engage in a policy evaluation 426 to evaluate whether the policies ensure that the email service remains secure and email accounts are accessed only by authorized users.

The network-based service may evaluate whether the email server complies with industry-standard encryption protocols for data at rest and in transit. This includes verifying the use of TLS for email transmission and AES or similar encryption standards for stored data. The network-based service may inquire or test (with permission) for known vulnerabilities in the email server's software. This includes checking the version numbers of the email server software against known vulnerabilities databases and verifying that the email server has a process in place for regular updates and patches. The network-based service may evaluate audit and logging policies to ensure that access logs are maintained accurately and securely. This includes checking how logs are stored, who has access to them, and how long they are retained. The network-based service may evaluate incident response and recovery plans to respond to security incidents. This includes reviewing the email server's incident response plan, understanding roles and responsibilities during an incident, and evaluating the server's backup and recovery procedures. The network-based service may evaluate third-party security assessments or certifications that the email server has obtained, such as ISO/IEC 27001, SOC 2, or PCI DSS compliance. These certifications can provide an additional layer of assurance regarding the email server's security posture. Authentication policies, such as two-factor authentication policies, fraud alert signals, and the like.

The evaluation may be manual, automated, or a mix of manual and automated methods. The policies may be evaluated against prespecified rules entered by an administrator of the network-based service. Once the email service passes the audit, an OTP may be sent-either just an OTP or within a code object as previously disclosed. If the email service does not pass, an OTP may not be sent by email. The network-based service may periodically monitor the policies of the email service to detect changes that may impact whether the network-based service complies with the policy rules.

Figure 5:
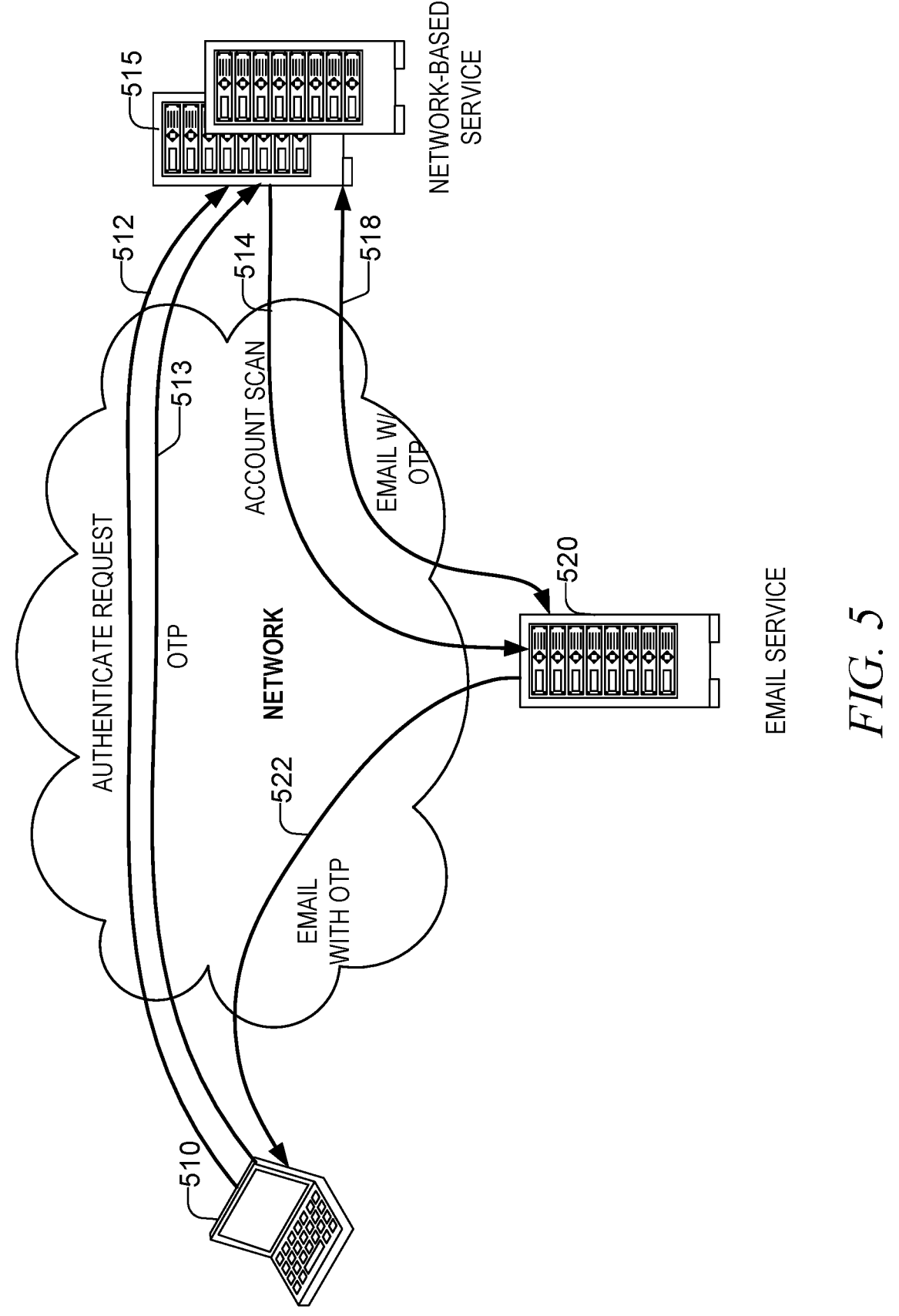
FIG. 5 illustrates a diagram of an enhanced email-based OTP authentication process involving a network-based service according to some examples of the present disclosure.

FIG. 5 illustrates a diagram of an enhanced email-based OTP authentication process involving a network-based service 515 according to some examples of the present disclosure. In this scenario, a user computing device 510 attempts to authenticate with the network-based service 515. An authentication request 512 is initiated by the user and received by the network-based service 515. In response to this request, the network-based service 515 may first verify primary credentials provided by the user (process not shown for clarity). Upon successful verification of the primary credentials, the network-based service 515 proceeds to a secondary authentication step involving an OTP.

Differing from the process described in FIG. 1, prior to sending the OTP, the network-based service 515 conducts a security scan 514 on the email service 520 associated with the user's account. This security scan 514 can be aimed at identifying any vulnerabilities within the email service 520 generally or specifically related to the account to which the OTP will be sent. The purpose of this security scan 514 is to ensure that the email service 520 and the user's email account are secure and have not been compromised, thereby safeguarding the OTP transmission.

Following the security scan 514, if no vulnerabilities are detected, the network-based service 515 may send an email with the OTP 518, or may send a code object or a link to a code object to generate an OTP through the network to the email service 520. The user can then access this OTP from their email account 522 and use it to complete the authentication process with the network-based service 515 by sending it to the network-based service 513. This additional step of scanning the email service 520 for vulnerabilities adds an extra layer of security to the authentication process, ensuring that the communication channel for the OTP is secure.

Figure 6:
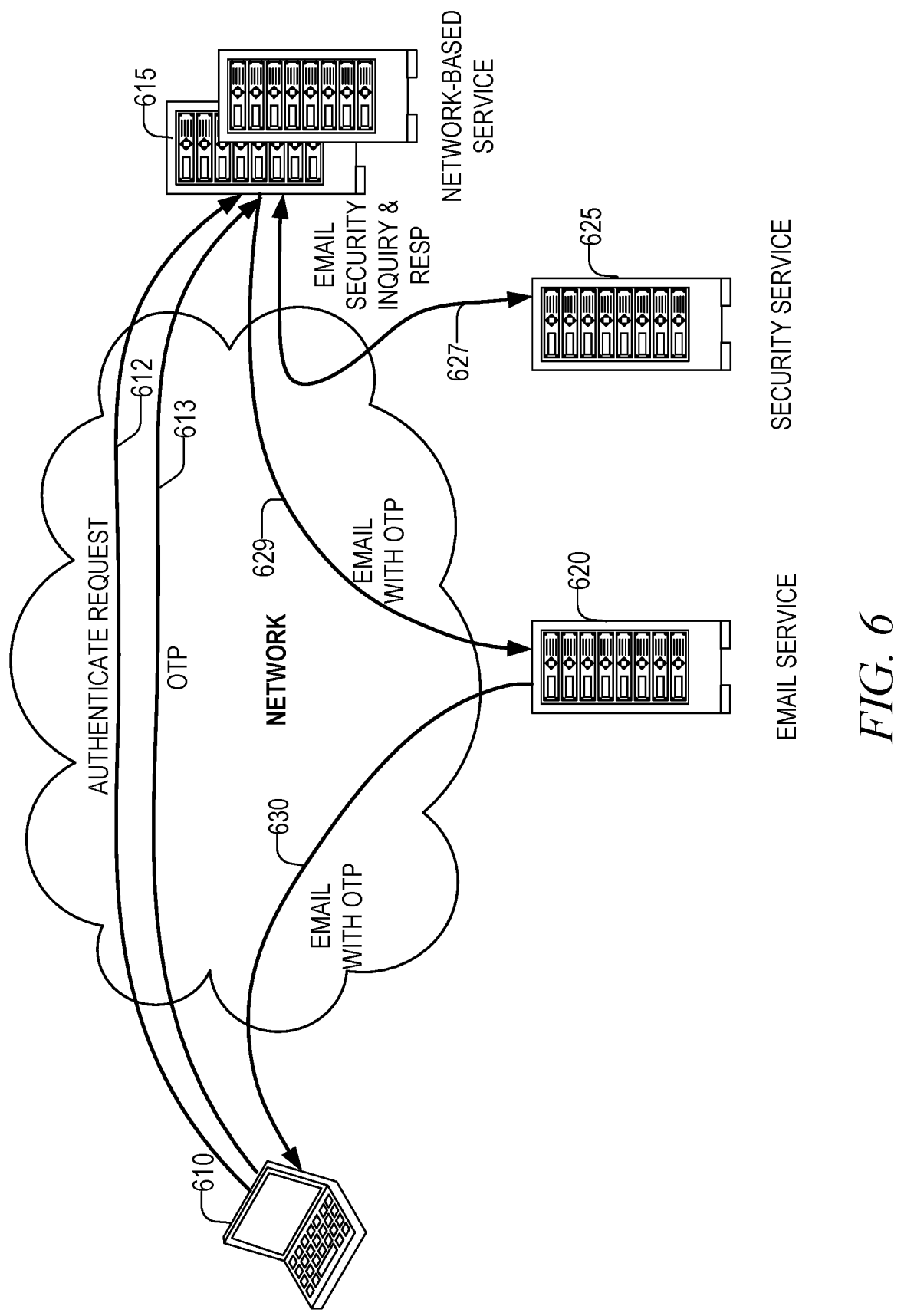
FIG. 6 illustrates a diagram of a further enhanced email-based OTP authentication process involving a network-based service and an external security service, according to some examples of the present disclosure.

FIG. 6 illustrates a diagram of a further enhanced email-based OTP authentication process involving a network-based service 615 and an external security service 625, according to some examples of the present disclosure. Similar to FIG. 5, a user computing device 610 attempts to authenticate with the network-based service 615. An authentication request 612 is initiated by the user and received by the network-based service 615. Following the verification of primary credentials (process not shown for clarity), the network-based service 615 moves to the secondary authentication step involving an OTP.

In this variation, before sending the OTP, code object, or link to a code object, the network-based service 615 consults an external security service 625 using communications 627 to check if the email address to which the OTP is intended has been compromised. The external security service 625 maintains a database of compromised email addresses and credentials. This database is queried to determine if the user's email address is listed among those considered compromised or at risk. The database is periodically refreshed from known online sources and online black markets of stolen credentials.

If the user's email address is found to be secure and not listed as compromised, the network-based service 615 proceeds to send an email with the OTP 629 through the network to the email service 620. This ensures that the OTP is sent to an email account that is secure and less likely to be under the control of unauthorized parties. The email is then retrieved 630 and the user can then use the OTP received via email to complete the authentication process 613 with the network-based service 615. By incorporating an external security service 625 in the authentication process, FIG. 6 demonstrates an advanced level of security verification, ensuring that the email account used in the authentication process is secure and trustworthy.

Figure 7:
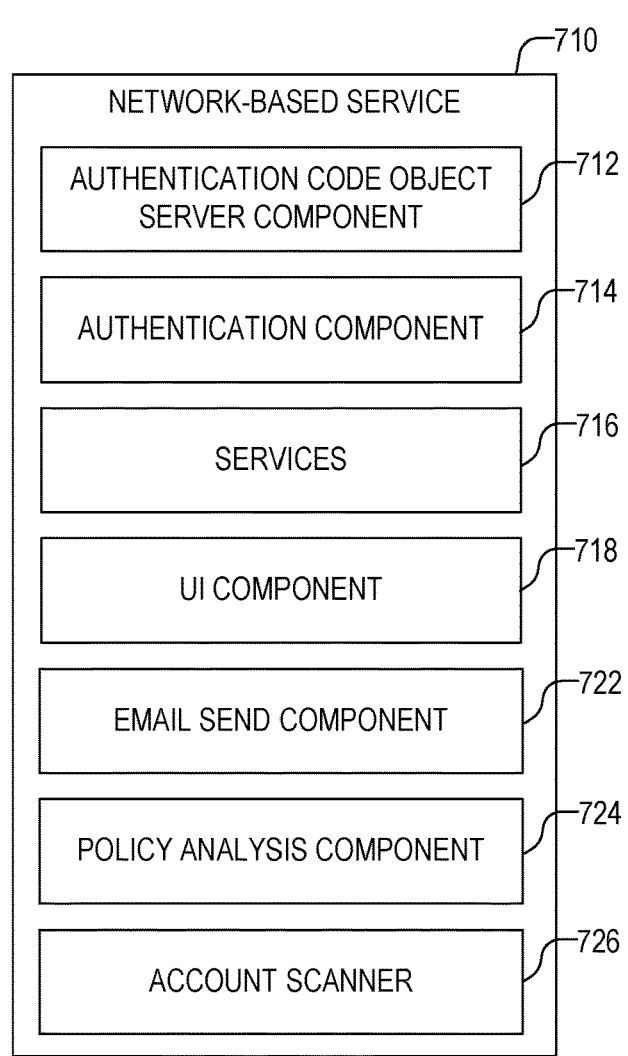
FIG. 7 illustrates a diagram of a network-based service of an enhanced email-based OTP authentication system designed to secure the delivery of OTPs via email according to some examples of the present disclosure.

FIG. 7 illustrates a diagram of a network-based service 710 of an enhanced email-based One-Time Password (OTP) authentication system designed to secure the delivery of OTPs via email according to some examples of the present disclosure.

Network-based service 710 includes an authentication code object server component 712 which is responsible for building the code object. This component generates custom code objects, which may include executable files, plugins, or scripts, tailored for individual customers. These code objects are designed to perform security evaluations on the user's computing device and facilitate the secure retrieval of OTPs. The code objects may be a standardized code object which is configured for each particular account holder, such as, by example, configuring the code object with the shared secret (or part of the shared secret) of the account holder.

Network-based service 710 may include an authentication component 714 authenticates a user to the service. The authentication component 714 verifies the primary credentials provided by the user and, upon successful verification, proceeds to the secondary authentication step involving an OTP. This component ensures that only authorized users gain access to the network-based service.

Network-based service 710 includes a services component 716 that provides the network-based services to the user. For example, offering various services and functionalities to authenticated users. This component interacts with other components to facilitate the authentication process and the delivery of services. Example network-based services include banking services, investment services, file-sharing services, communication services, network-based computing services, and the like.

The UI Component 718 provides one or more user interfaces (UIs) for authentication and providing the network-based service. It presents information to the user, collects user inputs, and displays the OTP or other authentication-related information. The UI component enhances the user experience by making the authentication process user-friendly and accessible.

The email send component 722 composes and sends an email, which may contain the OTP or the code object. This component ensures that the email is correctly formatted and securely sent to the user's email address.

The policy analysis component 724 evaluates the security policies of email providers. It assesses whether the email provider's policies meet specified security guidelines, including encryption standards, anti-phishing measures, and account recovery protocols. This evaluation helps in determining the security posture of the email service being used for OTP delivery.

The account scanner 726 scans the email server to determine if the user's account is compromised and/or scans the web (e.g., the dark web) to determine if the email is compromised. It assesses the security of the user's email account and the email service, looking for signs of compromise or vulnerability. This component adds an additional layer of security by ensuring that OTPs are sent to secure and uncompromised email accounts.

Together, these components form a robust system designed to enhance the security of email-based OTP delivery. By addressing various security concerns and vulnerabilities associated with email communication, the system ensures that OTPs are delivered in a secure and controlled manner, thereby strengthening the overall security framework of the authentication process.

Figure 8:
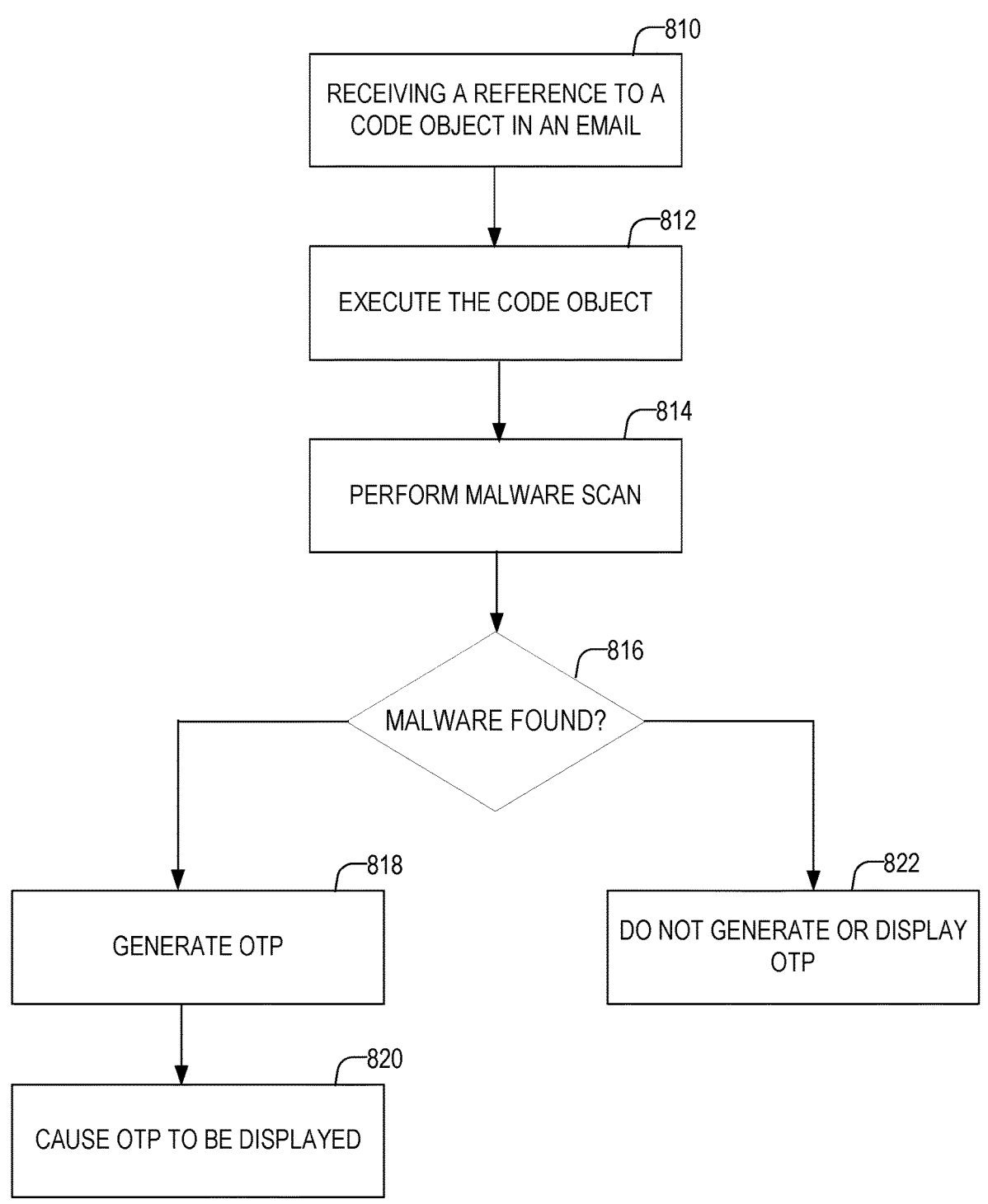
FIG. 8 discloses a method of securing email OTP delivery according to some examples of the present disclosure.

FIG. 8 discloses a method of securing email OTP delivery according to some examples of the present disclosure. At operation 810 the user computing device receives a reference to a code object in an email. The reference may be a link, a data structure describing an attachment or the like. At operation 812 the code object is retrieved and executed. At operation 814, the code object performs a malware scan. At operation 816, a determination of whether malware is found may be determined. If malware is found, then at operation 822, the system may not generate and display an OTP. If malware is not found, then at operation 818 and 820 an OTP is generated and displayed.

In some examples, once the code object is finished executing, it deletes itself from the user computing device. This may protect the secret value from subsequent hacking attempts.

Figure 9:
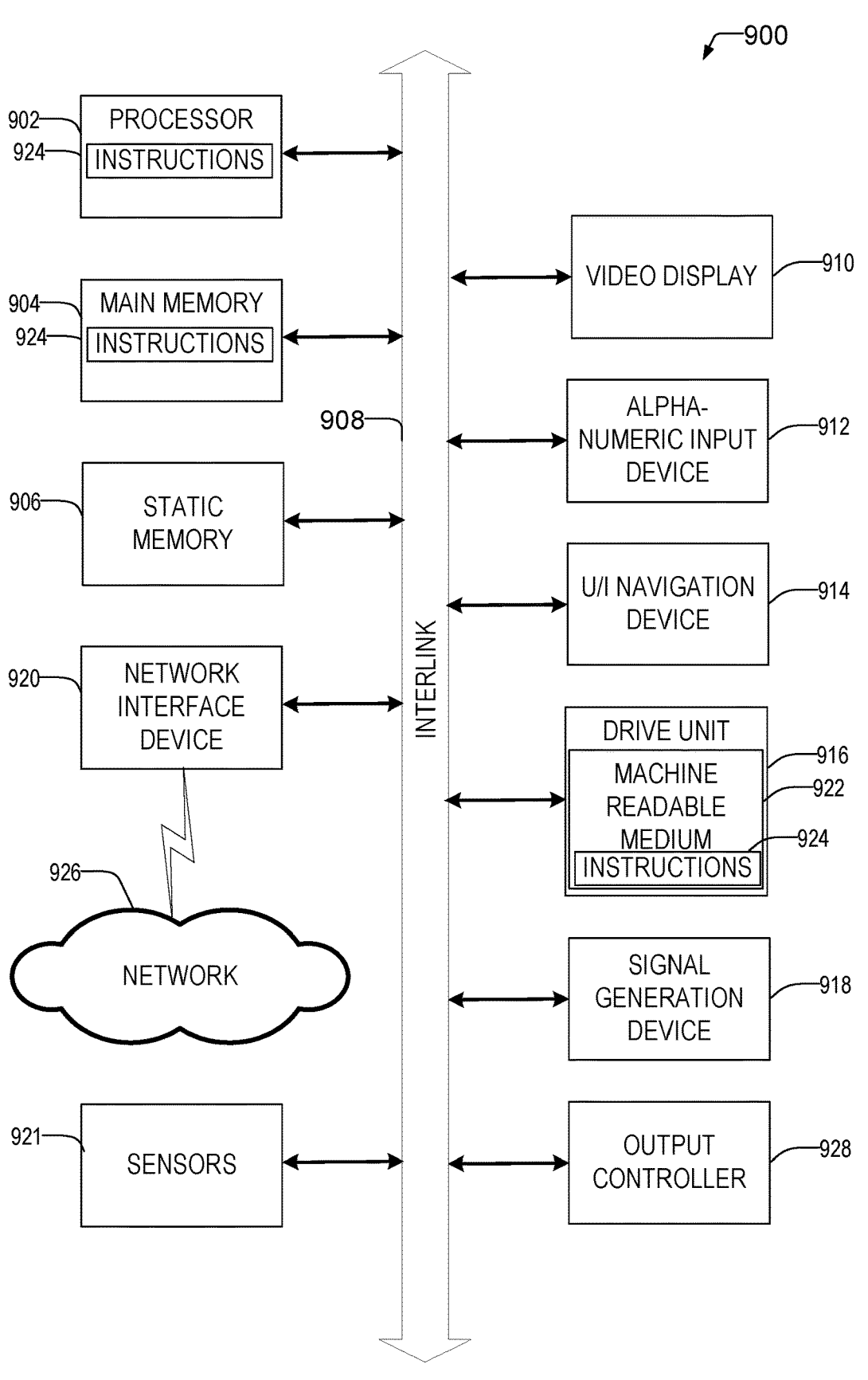
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may be performed. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be in the form of a desktop, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. User computing devices 110, 210, 310, 510, and 610; devices implementing network-based services 115, 215, 415, 515, 615; devices implementing email services 120, 220, 410, 520, 620; devices implementing the security service 625; may be or include components of the machine 900. Machine 900 may implement components of FIGS. 3 and 7 and methods of FIG. 9.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 900 may include one or more hardware processors, such as processor 902. Processor 902 may be a central processing unit (CPU), a graphics processing unit (GPU), a hardware processor core, or any combination thereof. Machine 900 may include a main memory 904 and a static memory 906, some or all of which may communicate with each other via an interlink (e.g., bus) 908. Examples of main memory 904 may include Synchronous Dynamic Random-Access Memory (SDRAM), such as Double Data Rate memory, such as DDR4 or DDR5. Interlink 908 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The Machine 900 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Notes and Examples

Example 1 is a method for securing email for sending a one-time-passcode, the method comprising: receiving, via an email sent by an authenticating computing system, an email comprising a reference to a code object; executing the code object, the code object performing the operations comprising: performing a scan of the computing system for malware; responsive to the scan completing without finding malware, generating a one time passcode using a seed value embedded in the code object; and causing the OTP to be displayed to a user.

In Example 2, the subject matter of Example 1 includes, wherein the operations performed by the code object further comprise: responsive to causing the OTP to be displayed to the user, setting a validity timer; responsive to the validity timer expiring, causing the OTP to cease being displayed to the user and deleting the code object.

In Example 3, the subject matter of Examples 1-2 includes, wherein the reference to the code object is an attachment to the email.

In Example 4, the subject matter of Examples 1-3 includes, wherein the reference to the code object is a web link within the email.

In Example 5, the subject matter of Examples 1-4 includes, wherein the operations performed by the code object further comprise: requesting an answer to a knowledge-based question, the knowledge-based question related to an account of the user on a network-based service that the user is attempting to use the OTP to authenticate with; and wherein causing the OTP to be displayed is only performed responsive to the answer being correct.

In Example 6, the subject matter of Examples 1-5 includes, wherein the code object further performs operations comprising: identifying a location of the computer system; and wherein causing the OTP to be displayed is only performed responsive to the location of the computer system being in a location that is within a threshold distance of a location specified for the user in an account of the user on the network-based service.

In Example 7, the subject matter of Examples 1-6 includes, wherein generating the one-time passcode comprises generating a Time-Based One Time Passcode using a current time and the seed value as input to a cryptographic hash algorithm.

Example 8 is a machine-readable medium, storing instructions, which when executed by a machine, cause the machine to perform operations comprising: receiving, via an email sent by an authenticating computing system, an email comprising a reference to a code object; executing the code object, the code object performing the operations comprising: performing a scan of the computing system for malware; responsive to the scan completing without finding malware, generating a one-time passcode using a seed value embedded in the code object; and causing the OTP to be displayed to a user.

In Example 9, the subject matter of Example 8 includes, wherein the operations performed by the code object further comprise: responsive to causing the OTP to be displayed to the user, setting a validity timer; responsive to the validity timer expiring, causing the OTP to cease being displayed to the user and deleting the code object.

In Example 10, the subject matter of Examples 8-9 includes, wherein the reference to the code object is an attachment to the email.

In Example 11, the subject matter of Examples 8-10 includes, wherein the reference to the code object is a web link within the email.

In Example 12, the subject matter of Examples 8-11 includes, wherein the operations performed by the code object further comprise: requesting an answer to a knowledge-based question, the knowledge-based question related to an account of the user on a network-based service that the user is attempting to use the OTP to authenticate with; and wherein causing the OTP to be displayed is only performed responsive to the answer being correct.

In Example 13, the subject matter of Examples 8-12 includes, wherein the code object further performs operations comprising: identifying a location of the computer system; and wherein causing the OTP to be displayed is only performed responsive to the location of the computer system being in a location that is within a threshold distance of a location specified for the user in an account of the user on the network-based service.

In Example 14, the subject matter of Examples 8-13 includes, wherein generating the one-time passcode comprises generating a Time-Based One Time Passcode using a current time and the seed value as input to a cryptographic hash algorithm.

Example 15 is a computing device comprising: a processor; a memory, storing instructions which when performed by the processor, cause the processor to perform operations comprising: receiving, via an email sent by an authenticating computing system, an email comprising a reference to a code object; executing the code object, the code object performing the operations comprising: performing a scan of the computing system for malware; responsive to the scan completing without finding malware, generating a one-time passcode using a seed value embedded in the code object; and causing the OTP to be displayed to a user.

In Example 16, the subject matter of Example 15 includes, wherein the operations performed by the code object further comprise: responsive to causing the OTP to be displayed to the user, setting a validity timer; responsive to the validity timer expiring, causing the OTP to cease being displayed to the user and deleting the code object.

In Example 17, the subject matter of Examples 15-16 includes, wherein the reference to the code object is an attachment to the email.

In Example 18, the subject matter of Examples 15-17 includes, wherein the reference to the code object is a web link within the email.

In Example 19, the subject matter of Examples 15-18 includes, wherein the operations performed by the code object further comprise: requesting an answer to a knowledge-based question, the knowledge-based question related to an account of the user on a network-based service that the user is attempting to use the OTP to authenticate with; and wherein causing the OTP to be displayed is only performed responsive to the answer being correct.

In Example 20, the subject matter of Examples 15-19 includes, wherein the code object further performs operations comprising: identifying a location of the computer system; and wherein causing the OTP to be displayed is only performed responsive to the location of the computer system being in a location that is within a threshold distance of a location specified for the user in an account of the user on the network-based service.

In Example 21, the subject matter of Examples 15-20 includes, wherein generating the one-time passcode comprises generating a Time-Based One Time Passcode using a current time and the seed value as input to a cryptographic hash algorithm.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for securing email for sending a one-time-passcode, the method comprising:
   receiving, via an email sent by an authenticating computing system, an email comprising a reference to a code object;
   executing the code object, the code object performing the operations comprising:
   performing a scan of a receiving computing system for malware;
   responsive to the scan completing without finding malware, generating a one-time passcode (OTP) using a seed value embedded in the code object; and
   causing the OTP to be displayed to a user.

2. The method of claim 1, further comprising:
   wherein the operations performed by the code object further comprise:
   responsive to causing the OTP to be displayed to the user, setting a validity timer;
   responsive to the validity timer expiring, causing the OTP to cease being displayed to the user and deleting the code object.

3. The method of claim 1, wherein the reference to the code object is an attachment to the email.

4. The method of claim 1, wherein the reference to the code object is a web link within the email.

5. The method of claim 1, wherein the operations performed by the code object further comprise:

requesting an answer to a knowledge-based question, the knowledge-based question related to an account of the user on a network-based service that the user is attempting to use the OTP to authenticate with; and wherein causing the OTP to be displayed is only performed responsive to the answer being correct.

6. The method of claim 1, wherein the code object further performs operations comprising:

identifying a location of the receiving computer system; and wherein causing the OTP to be displayed is only performed responsive to the location of the receiving computer system being in a location that is within a threshold distance of a location specified for the user in an account of the user on a network-based service.

7. The method of claim 1, wherein generating the one-time passcode comprises generating a Time-Based One Time Passcode using a current time and the seed value as input to a cryptographic hash algorithm.

8. A non-transitory machine-readable medium, storing instructions, which when executed by a machine, cause the machine to perform operations comprising:

receiving, via an email sent by an authenticating computing system, an email comprising a reference to a code object;

executing the code object, the code object performing the operations comprising:

performing a scan of a receiving computing system for malware;

responsive to the scan completing without finding malware, generating a one-time passcode (OTP) using a seed value embedded in the code object; and causing the OTP to be displayed to a user.

9. The non-transitory machine-readable medium of claim 8, wherein the operations performed by the code object further comprise:

responsive to causing the OTP to be displayed to the user, setting a validity timer; and responsive to the validity timer expiring, causing the OTP to cease being displayed to the user and deleting the code object.

10. The non-transitory machine-readable medium of claim 8, wherein the reference to the code object is an attachment to the email.

11. The non-transitory machine-readable medium of claim 8, wherein the reference to the code object is a web link within the email.

12. The non-transitory machine-readable medium of claim 8, wherein the operations performed by the code object further comprise:

requesting an answer to a knowledge-based question, the knowledge-based question related to an account of the user on a network-based service that the user is attempting to use the OTP to authenticate with; and wherein causing the OTP to be displayed is only performed responsive to the answer being correct.

13. The non-transitory machine-readable medium of claim 8, wherein the code object further performs operations comprising:

identifying a location of the computer system; and wherein causing the OTP to be displayed is only performed responsive to the location of the receiving computer system being in a location that is within a threshold distance of a location specified for the user in an account of the user on a network-based service.

14. The non-transitory machine-readable medium of claim 8, wherein generating the one-time passcode comprises generating a Time-Based One Time Passcode using a current time and the seed value as input to a cryptographic hash algorithm.

15. A computing device comprising:

a processor;

a memory, storing instructions which when performed by the processor, cause the processor to perform operations comprising:

receiving, via an email sent by an authenticating computing system, an email comprising a reference to a code object;

executing the code object, the code object performing the operations comprising:

performing a scan of a receiving computing system for malware;

responsive to the scan completing without finding malware, generating a one-time passcode (OTP) using a seed value embedded in the code object; and causing the OTP to be displayed to a user.

16. The computing device of claim 15, wherein the operations performed by the code object further comprise:

responsive to causing the OTP to be displayed to the user, setting a validity timer; and responsive to the validity timer expiring, causing the OTP to cease being displayed to the user and deleting the code object.

17. The computing device of claim 15, wherein the reference to the code object is an attachment to the email.

18. The computing device of claim 15, wherein the reference to the code object is a web link within the email.

19. The computing device of claim 15, wherein the operations performed by the code object further comprise:

requesting an answer to a knowledge-based question, the knowledge-based question related to an account of the user on a network-based service that the user is attempting to use the OTP to authenticate with; and wherein causing the OTP to be displayed is only performed responsive to the answer being correct.

20. The computing device of claim 15, wherein the code object further performs operations comprising:

identifying a location of the receiving computer system; and wherein causing the OTP to be displayed is only performed responsive to the location of the receiving computer system being in a location that is within a threshold distance of a location specified for the user in an account of the user on a network-based service.

* * * * *